D. W. MICKEY.
DRAG SAW.
APPLICATION FILED FEB. 25, 1919.
1,329,671.
Patented Feb. 3, 1920.
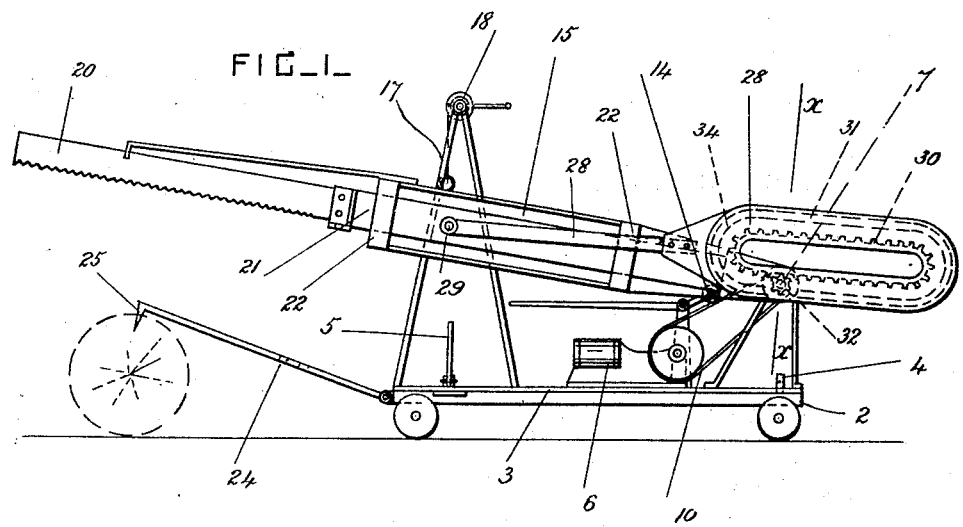
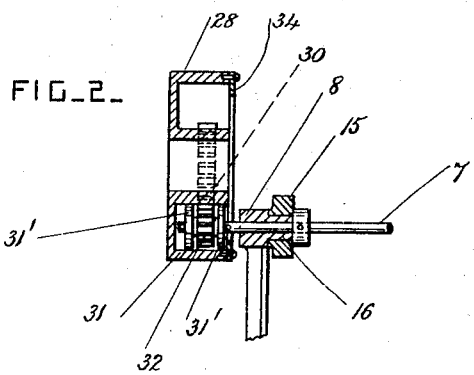
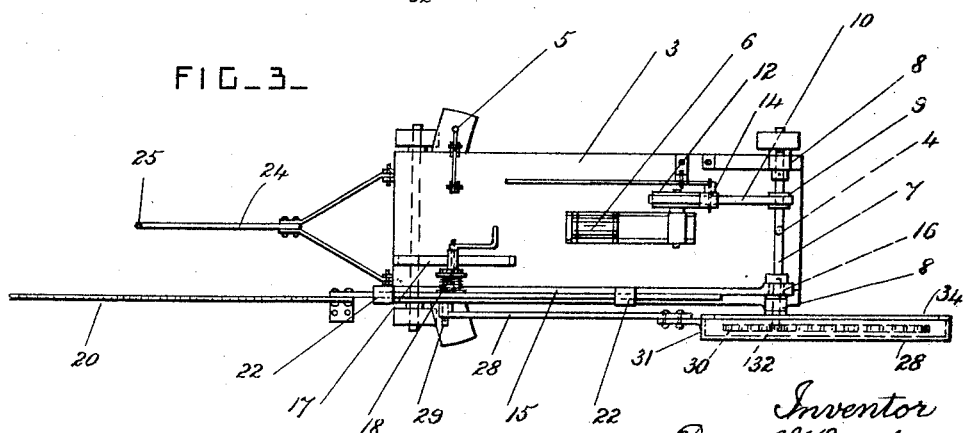
Inventor
Daniel W. Mickey
by Herbert W. T. Jenner
Attorney

UNITED STATES PATENT OFFICE.

DANIEL W. MICKEY, OF OMAHA, NEBRASKA.

DRAG-SAW.

1,329,671.   Specification of Letters Patent.   Patented Feb. 3, 1920.

Application filed February 25, 1919. Serial No. 279,046.

*To all whom it may concern:*

Be it known that I, DANIEL W. MICKEY, a citizen of the United States, residing at Omaha, in the county of Douglas and State of Nebraska, have invented certain new and useful Improvements in Drag-Saws, of which the following is a specification.

This invention relates to drag saws for cutting up logs of wood and also for felling trees; and it consists in the novel construction and combination of the parts hereinafter fully described and claimed.

In the drawings, Figure 1 is a side view of a drag saw constructed according to this invention. Fig. 2 is a cross-section through the toothed rack, taken on the line $x$—$x$ in Fig. 1 and drawn to a larger scale. Fig. 3 is a plan view of the drag saw.

The machine is preferably mounted on a wheeled truck or carriage 2 so as to be portable. A foundation plate or base plate 3 is pivoted to a pin 4 at one end portion of the truck, and is slidable horizontally on it. A lever 5 is suitably connected to the base plate for sliding it pivotally on the truck.

A motor 6 of any approved sort is mounted on the truck, and a gasolene engine is preferably used. The driving shaft 7 for the saw is mounted in bearings 8 at one end portion of the base plate, and it has a belt pulley 9 secured on it. This belt pulley is driven by a belt 10 from a pulley 12 on the driving shaft of the motor, and the shaft 7 is stopped and started by means of a belt tightener 14 of approved construction which tightens the belt when the driving shaft is to be revolved. This permits the motor to run continuously, but any other approved driving devices can be used besides the belt and belt pulleys.

The saw beam 15 is pivoted at one end on a long collar 16 which projects from one of the shaft bearings 8, and its other end portion is supported by means of a crane 17. This crane is provided with suitable hoisting mechanism 18 for raising and lowering the saw beam. The saw blade 20 is secured to a shank 21 which is slidable longitudinally in guides 22 on the saw beam 15. The guides 22 project laterally from the saw beam, so that the saw shank 21 and the saw beam are arranged side by side. The blade of the saw may be secured to the shank vertically, as shown, so as to saw logs of wood, or it may be secured to it horizontally so that it can be used for cutting down trees. An arm 24 is pivoted to the truck, and has a spike 25 at its free end which is driven into the log of wood to be sawed, so as to anchor the log of wood to the truck and prevent the log from being moved by the saw teeth.

The saw blade and its shank are reciprocated by means of a saw driver 28, the front end portion of which is pivoted to the saw shank by a pin 29. The rear part of the saw driver is provided with a toothed rack 30. This toothed rack is arranged in the form of a continuous loop and is of any desired length. It has semicircular end portions and straight intervening portions, and the teeth extend all around it and project outwardly. A guide loop 31 is arranged on the saw driver around the toothed rack, and is also loop-shaped in form and is arranged parallel to the toothed rack. Rollers 31' on the shaft 7 engage the guide loop.

A toothed driving pinion 32 is secured on one end portion of the driving shaft 7, and is arranged between the guide 31 and the toothed rack and in gear with the toothed rack. The guide 31 has a flange 34 at its edge which overlaps the toothed pinion, so that the toothed rack cannot slide laterally off the pinion. This flange 34 is preferably a detachable plate which is secured to the saw driver after the pinion and toothed rack have been placed in engagement with each other. The toothed driving pinion and its driving shaft are arranged concentric with the pivot collar 16 of the saw beam 15, and the driving shaft 7 is relieved of the weight and friction of the saw beam by means of the collar 16 which projects from the bearing 8 in which the driving shaft is journaled, and this arrangement also insures a long stationary bearing for the driving shaft to run in.

The base plate is moved pivotally to permit the saw to engage with different parts of the log, and the saw is lowered from time to time as it cuts into the log.

What I claim is:

In a drag saw, a supporting bearing, a driving shaft journaled in the said bearing, a saw beam having one end portion pivoted concentric with the said shaft, said saw beam being provided with two laterally projecting guides arranged at its free end portion and at its middle part respectively, means for adjustably supporting the free end portion of the saw beam, a saw blade provided with a shank which is slidable longitudinally in the said guides, a toothed driving pinion secured on the said driving shaft, a loop-shaped toothed rack arranged in gear with the said pinion, and a saw driver secured at one end to the said toothed rack and having its other end pivoted to the saw shank between the two guides in which it is slidable.

In testimony whereof I have affixed my signature.

DANIEL W. MICKEY.